United States Patent [19]
Gilford et al.

[11] 3,820,530
[45] June 28, 1974

[54] CARDIAC OUTPUT MEASURING METHOD AND APPARATUS

[75] Inventors: Saul R. Gilford, Oberlin; Gary M. Freeman, Grafton; John H. Bauman, Berea, all of Ohio

[73] Assignee: Gifford Instrument Laboratories, Inc., Oberlin, Ohio

[22] Filed: Feb. 16, 1973

[21] Appl. No.: 332,929

[52] U.S. Cl. ............ 128/2.05 F, 128/2 R, 356/36, 356/39
[51] Int. Cl. ...................... A61b 5/02, G01t 1/16
[58] Field of Search........ 128/2 R, 2 L, 395, 2.05 F, 356/36, 39–42, 208

[56] References Cited
UNITED STATES PATENTS

| | | | |
|---|---|---|---|
| 3,518,982 | 7/1970 | Timmins et al. | 128/2 R |
| 3,565,535 | 2/1971 | Monell | 356/39 |
| 3,622,795 | 11/1971 | Dorman et al. | 356/39 |
| 3,684,377 | 8/1972 | Adams | 356/39 |

Primary Examiner—Aldrich F. Medbery
Attorney, Agent, or Firm—Silverman & Cass

[57] ABSTRACT

Apparatus and method for practicing the Stewart-Hamilton method of measuring cardiac output but with dynamic calibration.

The apparatus includes a chamber into which a precise quantity of dye can be introduced for admixture with blood in the chamber. The flow of a subject's blood can then be switched from normal measuring flow through the densitometer to calibrating flow through the densitometer by a simple mechanical operation without stopping the procedure and without need for sterilization of any apparatus or changing of any equipment. An important component of the apparatus is a combined mixing chamber and cuvette which is disposable.

27 Claims, 4 Drawing Figures

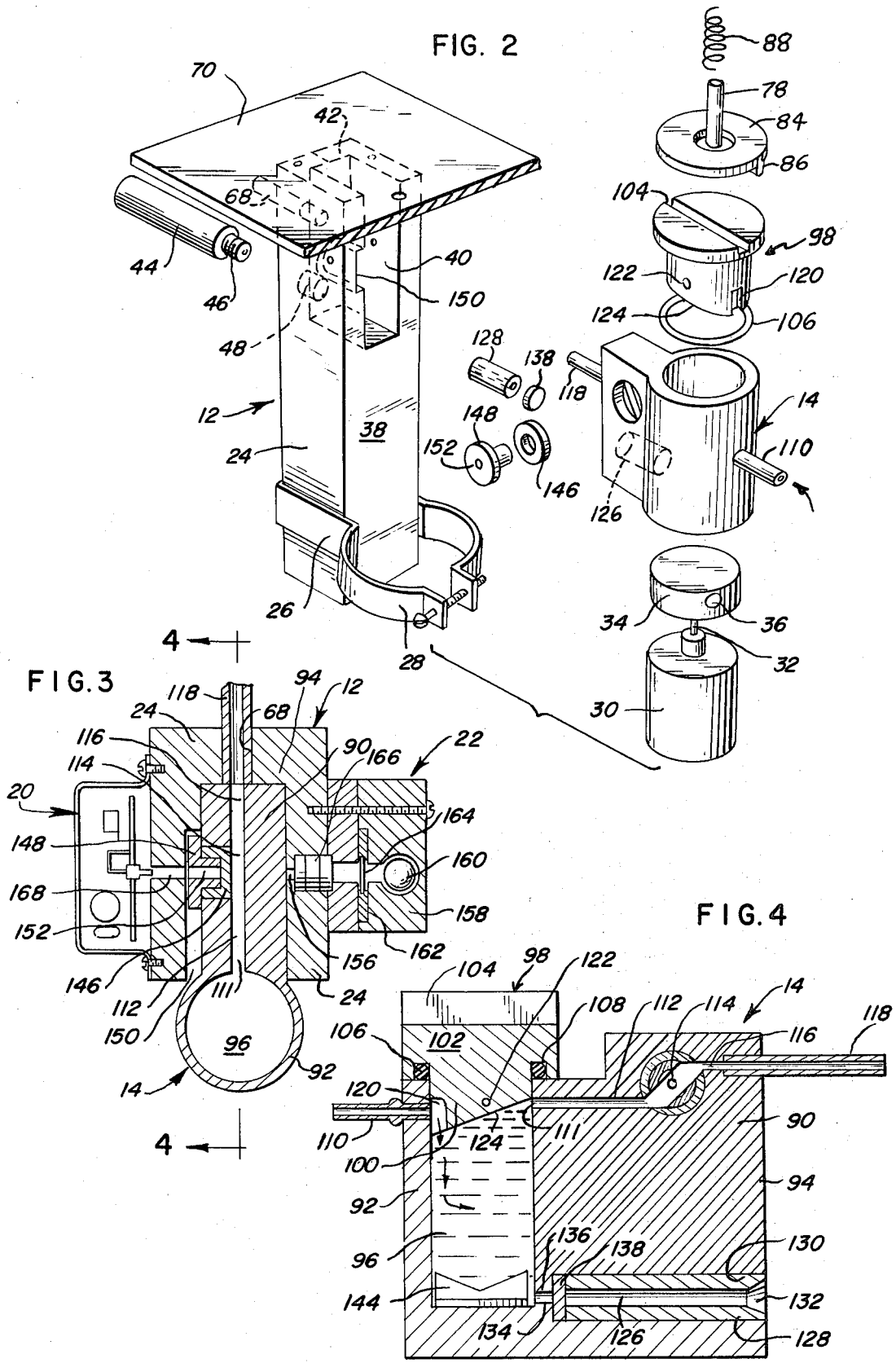

CARDIAC OUTPUT MEASURING METHOD AND APPARATUS

BACKGROUND OF THE INVENTION

The invention herein relates to a method and apparatus for calibrating densitometer systems used for measuring the flow-rate of blood through a subject's heart.

A technique in use today for measuring the flow-rate of blood through the heart is known as the Stewart-Hamilton method. According to this method, a suitable dye or other tracer material is injected into the heart through a venous input vessel and blood is drawn from an arterial vessel. The rate at which the injected material is diluted in its passage through the heart is a measure of the rate of flow of blood.

In order to draw the blood from the artery at a uniform rate, the blood stream is pumped to smooth the normal heart pulsing. The blood is flowed through a densitometer which measures the absorbance of light by the blood and produces output signals which can be plotted to give a curve of dilution versus time. This dye curve is then operated upon in accordance with a mathematical formula which has been classically derived to produce the so-called cardiac output curve.

Densitometers are available to provide plots of the original dye curve and the necessary computation can be made manually or by computer.

Heretofore, the most difficult part of the technique has been the calibration of the dye dilution curve to give the actual units of dye concentration in the blood. Normally, this has been effected by withdrawing blood from the patient prior to carrying out the dye dilution procedure and mixing aliquots of this withdrawn blood with known concentrations of the tracer material which is to be used in the technique. The resulting measurements are introduced into the densitometer to establish the quantitative value of its output.

This procedure is very demanding and even when accomplished with extreme care often produces erroneous results. In addition, it requires fairly substantial amounts of blood from the subject which is particularly undesirable in instances where the subject is a child. It also requires considerable time.

Because of the peculiarities and complex nature of the blood-dye mixture, the instrument must be calibrated at least once for each subject, and preferably, more than once during the measurement procedures. Thus, the calibration procedure is the weakest aspect of a technique which, although widely accepted and used, could be considered more reliable but for calibration inaccuracy.

Recently, a calibration technique was proposed for dye dilution densitometry in which the calibration was performed dynamically. In principle, an external model of the circulation system was set up in which a small chamber suitably scaled in size was introduced into the blood withdrawal system connected to the subject's artery in such a way that the subject's blood was drawn through this external mixing chamber and then through the densitometer by the same withdrawal pump that was used for the normal dye dilution curve on the subject. An accurately measured amount of dye is injected into the system ahead of the mixing chamber to be passed through the chamber and a dye dilution curve is recorded very similar in characteristics to that recorded from the subject itself. By suitably scaling the dimensions of the mixing chamber and the quantity of dye injected, it is possible to get a dye dilution curve which is almost identical in amplitude and time constant to the curve from the subject. In the calibration loop, however, the actual flow rate through the mixing chamber is known since it is determined by the withdrawal pump used in the system. Thus, a dye dilution curve is produced in which the flow rate is known and can be related to the dye dilution curve generated in the subject to determine the unknown flow rates.

The dynamic calibration technique has been described in the literature, including articles by Emanual, Hamer, et al., 28 British Heart Journal 143–146 (1966); Shinebourne, Fleming, et al., 29 British Heart Journal 920–925 (1967); and Vollm and Rollet, Journal of Allied Physiology, January, 1969, page 147.

The technique has not been universally adopted because the equipment required and the techniques described are not practical for use in clinical laboratories which are required to perform many routine tests continuously, including the blood dye dilution test. The technique as heretofore described requires skilled technicians, careful measurements and considerable time. Most laboratories are unwilling to go through the procedure because of the time consumed and because of the expense resulting. The skill of highly paid laboratory technicians is needed for other tasks.

According to the invention, the important advantages of the dynamic calibration technique are achieved with none of the disadvantages. The method and apparatus of the invention are simple and reliable. The apparatus is so economical that the blood carrying components are disposable. The calibration apparatus and method do not in any way disturb the subject and use a minimum quantity of blood. The blood dye dilution measurement is not interrupted or rendered complex by the method and apparatus. The apparatus enables accurate calibration measurements by taking cognizance of a discovery relating to dye equilibration described hereinafter.

SUMMARY OF THE INVENTION

According to the invention, a disposable structure is provided which has a mixing chamber with an integral mixer, a single control transfer valve, a sample dye input septum and an integral flowthrough cuvette. This structure is mounted in a holder which contains the dye injection means, the source of light and photoresponsive elements of the densitometer and the mixing motor. The blood input is coupled to the mixing chamber and blood is carried out of the mixing chamber through suitable ports, the transfer valve enabling the operator to divert blood through the chamber or bypass the chamber.

The disposable structure is easily installed and removed from the holder. The dye curve technique is not interrupted by the calibration procedure on account of the compactness and ease of operation of the calibration apparatus.

The method consists of running blood into the mixing chamber, introducing a known quantity of dye by injection into the chamber and mixing the same, then flowing the blood through the chamber into the densitometer and making the measurements.

BRIEF DESCRIPTION OF THE DRAWINGS

FIG. 2 is a perspective exploded view of the principal parts of the apparatus;

FIG. 3 is a sectional view through the apparatus taken generally along the line 3—3 of FIG. 1 and in the indicated direction;

FIG. 4 is a sectional view taken generally along the line 4—4 of FIG. 3 and in the indicated direction.

DESCRIPTION OF THE PREFERRED EMBODIMENT

Figure 1:
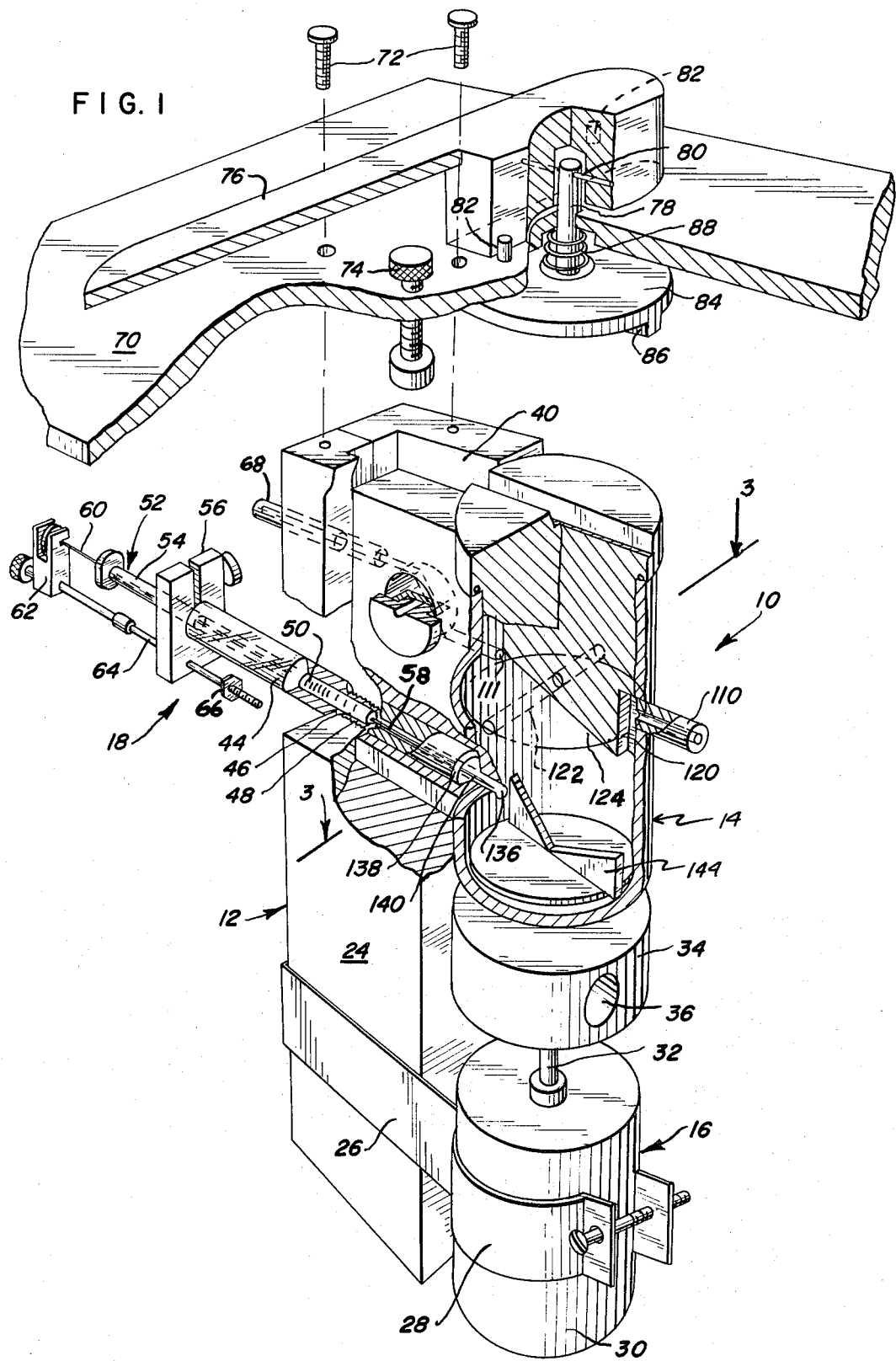
FIG. 1 is a perspective view with portions broken away, in section and exploded showing the apparatus of the invention, ready for use.

The apparatus of the invention is designated generally by the reference character 10, the same comprising generally several principal components. There is a vertical standard or holder 12 which receives a disposable mixing chamber and cuvette 14 in a suitable cavity, a mixing motor 16 mounted to the holder 12 and structure 18 for associating a calibrating dye-injecting syringe also mounted to the holder. Although not shown in the other views, in FIG. 3 there are illustrated in generally symbolic form an electronic device 20 and a radiation source 22 mounted on opposite sides of the holder 12. The radiation source 22 can be, for example, a source of light with suitable auxiliary apparatus and the electronic device 20 can be apparatus providing a signal output responsive to the radiation or light which it receives from the radiation source 22.

The holder 12 comprises a vertically arranged block 24 of opaque plastic, metal or the like nonlight-transmitting material which remains as a permanent part of the apparatus 10, it being appreciated that a portion of the apparatus is preferably disposable. Adjacent its bottom end, the block mounts a simple strap clamp 26 having resilient or mechanically contractible fingers 28 between which there is secured a small electric motor 30 adapted to be selectively energized from a suitable electrical source (not shown). The shaft 32 of the motor is arranged vertically and carries a rotor 34 within which there is embedded a small permanent magnet 36. The motor 34 is arranged to engage quite closely to the bottom of the disposable mixing chamber and cuvette 14 as will be explained.

The surface of the block 24 facing to the right in FIGS. 1 and 2 will be considered its front surface and is designated 38. A cavity 40 which is generally boxlike in configuration is formed in the upper end of the block 24 opening to the surface 38. This leaves a relatively thin wall 42 at the rear of the block 24. Adjacent the bottom end of the wall 42 is a support tube 44 generally cylindrical in configuration and having a threaded nipple 46 which engages into a threaded socket 48 provided in the wall 42. The tube is hollow so that there is a bore 50 on the interior thereof. An accurate syringe 52 has its barrel 54 engaged in the bore 50 and clamped to the tube 44 by the clamp 56. The needle 58 of the syringe 52 passes through the tube 44 and is adapted to enter the mixing chamber and cuvette component 14 in a manner to be explained. The plunger rod 60 of the syringe 52 is mounted on a block 62 that cooperates with an adjustable rod 64 passing through a suitable perforation in the clamp 56. Penetration of the needle 58 into a septum, which will be described hereinafter, is controlled by the location of the syringe barrel 54 with respect to the tube 44, this being provided by the adjustment of the clamp 56. The stroke of the plunger rod 60 is controlled by the rod 64 and the nut 66.

Adjacent the top of the wall 42 there is provided a sleeve 68 which passes through the wall. The purpose of this sleeve, which could be a simple hole through the wall, is to guide the output nipple of the mixing chamber and cuvette component 14 when the latter is in place, as will be explained.

A relatively large plate 70 is screwed to the top end of the block 24 by suitable fasteners 72. The plate carries a screw clamp 74 which has a knurled head above the plate and a pressure pad below, aligned with the cavity 40. After the component 14 is inserted in place in the cavity 40, the screw clamp 74 is used to press the component 14 into tight engagement with the holder 12. The plate 70 also has a swinging handle 76 adapted for swivel movement about the shaft 78 to which the handle is pinned at 80, the angular movement being indexed and limited to some angle by suitable protruding pins 82.

This angle is shown to be about 90° in the drawings but preferably is much less, say about 30° so that the switching function can be accomplished quickly. If continuous recording is being effected, the base line of the resulting graph is thus not greatly affected.

The bottom end of the shaft 78 has a disc 84 integral therewith, the bottom of the disc 84 having a depending ridge 86 for a purpose to be described. The shaft 78 provides substantial clearance between the disc 84 and the bottom of the plate 70 and a coiled spring 88 coaxial with the shaft 78 biases the disc to its lowermost position. Raising the handle 76 against the bias of the spring 88 will raise the disc 84 and cause at least disengagement of the ridge 86 from the valve, which will be described.

The disposable component 14 will now be described. This component 14 is preferably fabricated from plastic molded members suitably held together by electronic welding or cement but for the movable parts thereof. There are two main parts, a flange portion 90 and a cylindrical portion 92, with the flange portion 90 having the axis of the cylindrical portion 92 lying in the median plane thereof. The outer edge 94 of the flange portion 90 is parallel with the axis of the cylindrical portion 92.

The cylindrical portion 92 is hollow and forms a mixing chamber 96. A closure member 98 is tightly engaged within the upper end of the chamber 96 and comprises a reduced diameter plug portion 100 and an enlarged head 102. The head 102 has a large transverse slot 104 adapted to be engaged by the ridge 86 so that when the handle 76 is swivelled, it will turn the closure member 98 as well. Any other type of separable cooperative coupling can be used, such as for example, lugs and slots. It is preferred, however, that the coupling be effected by a sliding movement. An elastomeric O-ring 106 fits into a groove 108 provided in the head 102 to render the chamber 96 liguidtight when the closure member 98 is in place.

The component 14 has several passages therein which are formed by molding, drilling, etc. There is a nipple 110 set into a wall of the cylindrical portion 92 adjacent the upper end thereof and providing a passageway from the exterior of the component 14 either into the chamber 96 or by-passing the chamber, depending upon the position of the closure member 98.

A passageway 112 is provided in the flange portion 90 passing from the chamber 96 adjacent the upper end thereof partway through the flange portion 90. The passageway 112 and the bore of the nipple 110 are aligned. In the center of the flange portion 90 adjacent the upper end thereof there is provided a relatively rectangular cavity 114 which serves as a cuvette and hence will be termed as such. This cuvette 114 is arranged at an angle and connects with a passageway 116 that is formed in the flange portion 90 to provide the discharge of fluid from the component 14. There is a short length of pipe 118 set into the outer edge 94 of the flanged portion 90 aligned with the passageway 116, this comprising the output nipple previously mentioned. When the component 14 is assembled within the cavity 40, this output nipple 118 will pass through the sleeve 68 and provide means to attach flexible conduits to the apparatus 10 for recirculating the blood passing through the apparatus.

The construction of the closure member 98 is such as to constitute the same a two-way valve. When the position of the closure member 98 is as shown in FIG. 4, the blood which enters by way of the input nipple 110 flows into a recess 120 and into the chamber 96. After the chamber has been filled, the blood leaves by way of the chamber discharge port 111, enters the passageway 112 and flows through the cuvette 114, the passageway 116 and out of the output nipple 118. The bottom surface of the closure plug 100 is formed on an angle 124 to uncover the entrance to passageway 112. Importantly, this angular arrangement 124 promotes clearing of bubbles from chamber 96 since the bubbles will rise to the surface and be moved to the chamber discharge port 111 by the angled surface 124.

If the closure member is turned to align a straight-through transverse passage 122 with the input nipple 110 and the passageway 112, the plug portion 100 will block flow to the chamber 96 so that blood entering the input nipple 110 flows directly through the passageway 122 to the passageway 112, by-passing the chamber 96.

The bottom of the component 14 has a passageway or bore 126 formed in a cylindrical plug 128 that is set into a hole 130 drilled through the flange portion 90 in alignment with the bore 50 of the tube 44. The entrance to the bore 126 is countersunk, as shown at 132, for piloting purposes, since this bore 126 will receive the needle 58 of the syringe 52. The hole 130 is drilled in a manner to stop just short of the chamber 96 to provide a shoulder 134 and a short passageway 136. When the plug 128 is inserted into place, a small disc or septum 138 of elastomeric material is first engaged against the shoulder 134, thereby blocking passage of fluid between the bore 126 and the chamber 96.

This structure is intended to be used to inject dye into the chamber 96 and it is done simply by pushing the point 140 of the needle 58 through the septum 138 so that it lies in the short passageway 136 and then manipulating the plunger. The needle point or cannula 140 is easily withdrawn without permitting loss of fluid from the chamber 96, the elastomeric material being self-sealing.

The bottom of the chamber 96 has a loose paddle wheel 144 that has a permanent magnet or other ferromagnetic material embedded therein. Rotating the shaft 32 of the motor 30 will rotate the rotor 34 and magnetically couple the paddle wheel 144 with such rotation for mixing the liquid in the chamber 96.

Attention may now be directed to the cuvette 114 and related structure. The cuvette 114 is cut or molded into a cylindrical cavity as best shown in FIG. 2 and the cavity is plugged with a small cylindrical plug 146. This plug 146 is made out of transparent plastic and is cup-shaped. An opaque plug 148 is engaged into the plug 146, the opague plug having a relatively large flanged head and a central light passageway 152. The flanged head overlies the surface of the flanged portion 90 of the component 14 and the cavity 40 has a groove 150 to receive the flange when the assembled component 14 is pushed home. Aligned with the passageway 152 on the opposite side of the opaque block 24 there is provided the radiant source 22 which produces a beam of light passing through the opening 156 across the transparent walls of the flanged portion 90, through the liquid flowing in the cuvette 114, through the plug 146 and out of the opening 152. The construction of the plug 148 prevents light leakage.

The block 24 is not light transmissive, but the flange portion 90 does transmit light, preferably being molded from some clear synthetic resin (popularly referred to as "plastic" but relatively rigid) suitably compatible with the fluids to be transported. Light cannot be piped around the flange portion by way of the block 24 but must pass through the flange portion. The cuvette 114 may be accurately molded between passageways 112 and 116. Its right-hand face (FIG. 3) is perfectly flat and parallel with the large surfaces of the flange portion 90. It is formed at the bottom of a cylindrical recess or cavity plugged with the cup-shaped plug 146. The inner surface of the plug 146 provides the left-hand (FIG. 3) perfectly flat surface of the cuvette 114 accurately parallel with the right-hand face. The reduced diameter probe of the opaque button or plug 148 enters well into the cut of the plug 146 and hence being its light passageway 152 very close to the cuvette 114 to receive the light passed through said cuvette, excluding any diffused or scattered light which may have passed elsewhere through the flange portion 90. The overlying disc-like outer flange of the plug 148 engages directly against the inner surface of the left-hand wall of the cavity 40 within the slot 150 so that any possible bypassing light is excluded at this point as well.

The radiant source comprises a housing 158 fastened to the block 24 and having a light source such as a tungsten bulb 160 mounted therein to be energized from some suitable electrical power source. A holder 162 mounts a calibrated attenuator 164 to give the resulting light energy desired when calibration is taking place. Otherwise for normal dye dilution measurements this attenuator is not in position. It is placed in intercepting position when blood flows through the chamber 96. An interference filter arrangement 166 completes the structure and directs the beam as described above.

On the other side of the holder 12, a hole 168 directs the light beam to the electronic device 20 which is a part of the densitometer by means of which the desired data will be acquired.

In use, the apparatus is set up to permit the blood flow of the patient to pass through the cuvette 114 for the normal dye dilution curves to be made with the closure in position so that the passageway 112 is used, by-passing the chamber 96. By manipulation of the handle 76 at the beginning of the test the chamber 96 is filled with the subject's blood to be able to effect the calibration procedure as a part of the test. When a calibration is desired, the precise amount of dye is injected into the chamber 96 through the septum 138 and the closure or valve is quickly switched to the condition shown in FIG. 4. There is no interruption of the procedure, everything remains sterile and no time is lost. The entire component 14 can be made very economically and it can be discarded after the tests have been run.

It will be appreciated that the chamber 96 is filled with blood while the subject's principal flow is bypassing the same. The dye is thus injected into the chamber under conditions of zero flow and mixed for a short while, thus also giving a slight delay to permit dye equilibration.

We have discovered that it is essential for calibration accuracy that the normal type of dyes used in dye-dilution techniques must be given a period of time while mixed with blood to stabilize. The prior techniques and structures showed no appreciation of this important discovery. In known dynamic calibration technique no provision was made for introduction of the dye material into a mixing chamber with the blood remaining in the chamber for a delay time at zero flow (although being mixed) to give the dye material an opportunity to achieve a condition of stable relationship with the blood.

Herein, the arrangement with the substantial self-sealing septum 138 which permits introduction of the dye into the chamber 96 (in liquid form, of course) without loss of fluid from the system is important. Flow is not interrupted and the desired delay is achieved while also mixing the dye and the aliquot of blood outside of the direct flow of blood through the cuvette. The switchover for calibration is effortless and can be accomplished almost instantaneously and clearly without stopping the procedure or the flow of the subject's blood. The inclusion of the septum arrangement in the disposable component 14 assures sterility at all times and for each successive cardiac output determination.

While it is preferred to have the component 14 readily disposable, it is feasible to provide apparatus using the teachings of the invention which is permanent and adapted to be cleaned and sterilized between determinations.

In installing the disposable component 14 the screw 74 is retracted and the handle 76 is turned so that the ridge 86 (or other coupling means) is aligned as shown in FIG. 1 parallel with the long dimension of the groove 150, that is, right and left in FIGS. 1 and 2. The groove or slot 104 is also aligned parallel with the direction in which the component 14 is to be slid into the cavity 40. As the component 14 is slid into place with the outer disc-like flange of the plug 148 engaged into the groove 150, the handle 76 is raised against the bias of the spring 88 sufficient to enable the disc 84 raising to be pushed home. The handle 76 is then released to cause engagement of the coupling means 86 and 104. Thereafter, the screw 74 is tightened, the flexible tubing extending to the subject is connected to the apparatus 10 and the process may be commenced. To remove the component 14, the tubing to the subject is disconnected, the screw 74 is loosened, the handle 76 is raised and the component 14 is slipped out and discarded. It is appreciated that even if the operator has neglected to withdraw the needle tip 140 from the septum 138, the withdrawal of the component 14 from the cavity 40 of the holder will disengage the said needle tip 140 and the self-sealing character of the septum will keep any remaining fluids in the chamber 96 from leaking out.

Although not shown, suitable means are provided accessible from the top of the plate 70 to enable the attenuator 164 to be moved into or out of the path of the light beam from the lamp 160.

It will be appreciated from the above description that many variations in the apparatus of the invention and some variations in the method may be made without departing from the spirit or scope thereof as defined in the appended claims.

What it is desired to secure by Letters Patent of the United States is:

1. Apparatus for use in measuring cardiac output and calibrating such measurement, which comprises:
   A. a cuvette and means for leading a flow of blood from a subject through the cuvette to measure the density of any test substance which may have been introduced into the blood,
   B. a mixing chamber of known volume,
   C. means for introducing an accurate amount of test substance into said chamber without permitting discharge of any fluid from said chamber,
   D. valve means upstream of said cuvette and interposed in said flow leading means and including means for directing flow into said chamber for a temporary zero flow condition and then through said chamber passing through said cuvette in one condition of said valve means, or to direct flow to said cuvette by-passing said chamber in a second condition of said valve means, and
   E. structure operable to place said valve means in either of said two conditions.

2. The apparatus as claimed in claim 1 in which said introducing means includes a septum facing the interior of said chamber and a sharp cannula adapted to pierce said septum.

3. The apparatus as claimed in claim 1 in which said introducing means comprises an elastomeric septum closing off an access opening to said chamber and an adjustable volume pump having a hollow pointed needle output passageway adapted to be pierced through the septum so that the pump may be emptied into said chamber and withdrawn from said septum.

4. The apparatus as claimed in claim 1 in which said introducing means comprises an elastomeric septum closing said chamber, a pre-settable syringe and means for holding the syringe in position with its needle arranged to be introduced through said septum to enable discharge of the contents thereof into said chamber.

5. The apparatus as claimed in claim 1 in which means are provided for mixing the fluid in said chamber comprising a mixing device within the chamber and a rotary magnetic member exterior of said chamber magnetically coupled with said mixing device.

6. The apparatus as claimed in claim 1 in which said valve means includes a closure for said chamber rendering said chamber liquid tight but for the passage of blood as aforesaid.

7. The apparatus as claimed in claim 1 in which said valve means includes a cylindrical plug rotatable in and serving as the closure for said chamber.

8. The apparatus as claimed in claim 1 in which said chamber has a cylindrical entrance at the upper end thereof, said valve means includes a cylindrical plug in fluidtight yet rotatable engagement with said entrance, said flow leading means including a pair of opposed but aligned passageways comprising upstream and downstream passageways opening to said chamber, said plug having a transverse passageway adapted to connect said aligned passageway openings when the plug is rotated to an angular disposition in said cylindrical entrance so that said transverse passageway is so connected and said angular disposition comprising the said second condition of said valve means.

9. The apparatus as claimed in claim 1 in which said cuvette and mixing chamber comprises a unitary component including said valve means, a holder is provided for receiving said unitary component and said holder having an externally operable lever adapted to be brought into coupled engagement with said valve means when said unitary component is in operative position in said holder.

10. The apparatus as claimed in claim 7 in which said plug has flow directing passageways therein and said flow leading means includes ports in said chamber, said plug adapted to be rotated to bring its passageways into different relationships with said ports for achieving said first and second conditions.

11. The apparatus as claimed in claim 7 in which said structure operable to place said valve means in either of said two conditions comprises a swingable lever and a separable nonrotatable connection between the lever and the plug.

12. The apparatus as claimed in claim 11 in which means are provided for indexing and limiting the movement of said lever to achieve said two positions.

13. The apparatus as claimed in claim 12 in which means are provided to bias the lever and plug together but permitting overcoming said bias to enable disassociation of said plug from said lever.

14. The apparatus as claimed in claim 8 in which said plug has a recess formation angularly spaced from said transverse passageway adapted when the plug is rotated to a different angular disposition to align with the upstream one of the opposed passageways to direct entering fluid into said chamber and the plug having a configuration at the same time uncovering the downstream one of said opposed passageways while blocking said transverse passageway, said different angular disposition comprising said first condition of said valve means.

15. The apparatus as claimed in claim 14 in which the angular dispositions are at most 90° apart.

16. The apparatus as claimed in claim 14 in which the plug has means for emptying air bubbles from said chamber when said plug is in said different angular disposition.

17. The apparatus as claimed in claim 9 in which said unitary component comprises an integral cylindrical portion having said chamber formed therein, a flanged portion having the cuvette formed therein, a first passageway from the chamber to the cuvette, said holder having means for directing radiation across the flanged portion and through said cuvette, a second passageway comprising a part of said leading means and adapted to convey blood from said subject to said chamber, said first and second passageways having ports opening into said chamber, and a third passageway for carrying blood away from said cuvette, said holder having a conduit for said third passageway, said valve means comprising a rotatable closure for said chamber provided with a transverse connecting passageway and a recess and being so configured so that in one rotational position comprising the first condition of said valve means the transverse connecting passageway is blocked and blood enters from said second passageway, passes through its port into the chamber, flows through the chamber and into the other port, through the first passageway and the cuvette and the third passageway, while in a second rotational position of said closure comprising the second condition of said valve means only the transverse connecting passageway is between the ports so that blood entering the second passageway passes directly to the cuvette by-passing the chamber.

18. The apparatus as claimed in claim 9 in which the introducing means comprises a syringe having a hollow needle mounted to said holder, a bore for the needle in the holder and an elastomeric septum in the unitary component facing and closed to the chamber and aligned with said bore when said unitary component is in place in said holder.

19. A unitary component for apparatus for use in measuring cardiac output and calibrating such measurement, the component adapted to be disposable and adapted to be mounted to a holder which has mixing means, structure including a needle guide for introducing a fluid substance into said unitary component, valve manipulating means, a radiation path for densitometric purposes, said component comprising:
  A. a cylindrical portion having a mixing chamber with a closure having valving structure formed therein comprising means for establishing two conditions intwo different angular dispositions of the closure,
  B. a lateral portion connected to the cylindrical portion and adapted to be secured to said holder,
  C. an input passageway in the cylindrical portion adapted to be connected to a source of blood flowing to said apparatus and having an input port opening into the chamber,
  D. a discharge port in the lateral portion for leading blood from said unitary component,
  E. a cuvette formed in the lateral portion and adapted to be aligned with the radiation path when the unitary component is in place in said holder so that radiation may pass transversely through said cuvette,
  F. a cuvette discharge passageway in said lateral portion connecting the cuvette to said discharge port,
  G. a cuvette connecting passageway in said lateral portion extending from said cuvette to said chamber and having a chamber discharge port opening to said chamber to lead fluid from said chamber to said cuvette,
  H. the valving structure of the closure having means for cooperating with the valve manipulating means when the unitary component is connected to said holder,
  I. one condition of the valving structure providing a direct connection between the input port and chamber discharge port, and the second condition providing means for flow of blood into said chamber for a temporary zero flow condition and then through said chamber into said cuvette connecting passageway.

20. A structure as claimed in claim 19 in which said chamber has an elastomeric septum adapted to align with said needle guide when said unitary component is mounted to said holder whereby said substance may be introduced into said chamber through said septum without loss of fluid from said chamber.

21. A structure as claimed in claim 19 in which the valving structure comprises a transverse straight-through passageway adapted to have its ends aligned with the respective input port and chamber discharge port during said one condition of the valving structure.

22. A structure as claimed in claim 21 in which the valving structure additionally comprising a diverting recess in said closure and an angled surface of the bottom of said closure, the diverting recess adapted to be aligned with said input port while the angled surface uncovers said chamber discharge port in said second condition of said valving structure so that any fluid entering said input port must pass through the chamber before passing into said chamber discharge port.

23. A structure as claimed in claim 19 in which the lateral portion is radiation transmissive and a radiation opaque guide is aligned with said cuvette and adapted to be aligned with said radiation path when the component is mounted in the holder substantially to confine radiation passing through said cuvette and thereafter passing through said lateral portion while substantially excluding radiation by-passing said radiation path.

24. A method of measuring cardiac output by the Stewart-Hamilton technique and calibrating such measurement which includes commencing a flow of the subject's blood through a densitometer, providing a chamber with an aliquot of the subject's blood in said chamber in a temporary zero flow condition, introducing a precise proportion of a trace material into said chamber while under said condition of zero flow through said chamber and mixing the trace material with said blood, maintaining said zero flow condition until the trace material in said aliquot has stabilized, then resuming and directing the the flow through the chamber to said densitometer so that the densitometer indicates the dilution characteristics of the trace material in said aliquot.

25. A method of measuring cardiac output by the Stewart-Hamilton technique and calibrating such measurement which includes establishing a continuous flow of subject blood through a densitometer, establishing in a dye-dilution chamber an aliquot of blood in a temporary zero flow condition for an accurate proportional measurement of dye and said aliquot of subject blood, and switching the flow between said chamber and by-passing the chamber without interrupting said flow.

26. The method as claimed in claim 25 in which dye is injected into said chamber and mixed therein while said flow is by-passing the chamber.

27. The method as claimed in claim 26 in which the dye is permitted to remain in the chamber after injection for a sufficient length of time before switching flow into said chamber to enable equilibration of said dye in said aliquot.

* * * * *

PO-1050
(5/69)

UNITED STATES PATENT OFFICE
CERTIFICATE OF CORRECTION

Patent No. 3,820,530      Dated June 28, 1974

Inventor(s) Saul R. Gilford; Gary M. Freeman; John H. Bauman

It is certified that error appears in the above-identified patent and that said Letters Patent are hereby corrected as shown below:

Column 2, line 17, "Allied" should read -- Applied --.

Column 3, line 44, "motor" should read -- rotor --.

Column 6, line 38, "cut" should read -- cup --.

Column 6, line 66, "112" should read -- 122 --.

Column 10, line 32, "intwo" should read -- in two --.

Column 12, line 9, "directing" should read -- redirecting --.

Column 12, line 9, delete "the", second occurrence.

Signed and sealed this 5th day of November 1974.

(SEAL)
Attest:

McCOY M. GIBSON JR.      C. MARSHALL DANN
Attesting Officer      Commissioner of Patents

UNITED STATES PATENT OFFICE
CERTIFICATE OF CORRECTION

Patent No. 3,820,530        Dated June 28, 1974

Inventor(s) Saul R. Gilford; Gary M. Freeman; John H. Bauman

It is certified that error appears in the above-identified patent and that said Letters Patent are hereby corrected as shown below:

In the heading of the patent Item (73) should read as follows:

Assignee: Gilford Instrument Laboratories, Inc.
          Oberlin, Ohio

Signed and sealed this 8th day of April 1975.

(SEAL)
Attest:

RUTH C. MASON
Attesting Officer

C. MARSHALL DANN
Commissioner of Patents
and Trademarks